(12) United States Patent
Ko et al.

(10) Patent No.: US 6,788,374 B2
(45) Date of Patent: Sep. 7, 2004

(54) MULTI-DOMAIN LIQUID CRYSTAL DISPLAY DEVICE AND METHOD FOR FABRICATING THE SAME

(75) Inventors: Doo Hyun Ko, Kumi-shi (KR); Joun Ho Lee, Taegu-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 150 days.

(21) Appl. No.: 09/888,652

(22) Filed: Jun. 26, 2001

(65) Prior Publication Data

US 2002/0005927 A1 Jan. 17, 2002

(30) Foreign Application Priority Data

Jun. 27, 2000 (KR) .......................................... 2000-35649

(51) Int. Cl.[7] ..................... G02F 1/1337; G02F 1/1343
(52) U.S. Cl. .................... 349/129; 349/139; 349/143
(58) Field of Search ................................ 349/129, 139, 349/141, 143

(56) References Cited

U.S. PATENT DOCUMENTS

| | | | |
|---|---|---|---|
| 3,914,022 A | 10/1975 | Kashnow | 350/160 LC |
| 4,581,608 A | 4/1986 | Aftergut et al. | 340/704 |
| 4,701,028 A | 10/1987 | Clerc et al. | 350/337 |
| 4,728,175 A | 3/1988 | Baron | 350/336 |
| 4,786,147 A | 11/1988 | Clerc et al. | 350/337 |
| 4,889,412 A | 12/1989 | Clerc et al. | 350/347 |
| 4,937,666 A | 6/1990 | Yang | 358/136 |
| 4,978,203 A | 12/1990 | Yamazaki et al. | 350/339 R |
| 5,039,185 A | 8/1991 | Uchida et al. | 359/75 |
| 5,093,741 A | 3/1992 | Shohara et al. | 359/90 |
| 5,182,664 A | 1/1993 | Clerc | 359/93 |
| 5,229,873 A | 7/1993 | Hirose et al. | 359/55 |

(List continued on next page.)

FOREIGN PATENT DOCUMENTS

| | | |
|---|---|---|
| EP | 0159161 B1 | 10/1985 |
| EP | 0159161 A1 | 10/1985 |

(List continued on next page.)

OTHER PUBLICATIONS

A. Lien et al; "Two–Domain TN–LCDs Fabricated by Parallel Fringe Field Method"; SID '93 DIGEST; pp. 269–272.

(List continued on next page.)

*Primary Examiner*—Tarifur R. Chowdhury
(74) *Attorney, Agent, or Firm*—McKenna Long & Aldridge LLP (57) ABSTRACT

A multi-domain LCD device and a method for fabricating the same improve response time and picture quality. The multi-domain LCD device includes first and second substrates having pixel regions, a pixel electrode formed on the second substrate, a first side electrode formed along the periphery of the pixel electrode, a second side electrode formed in a diagonal direction of the pixel electrode, and first and second dielectric frames respectively formed in the same direction as the second side electrode on the first substrate corresponding to the second side electrode. The method for fabricating a multi-domain LCD device includes the steps of forming a first side electrode on a substrate in a matrix arrangement, forming a second side electrode to connect both ends with a corner portion of the first side electrode, forming a pixel electrode having a plurality of open regions at an upper side of the second side electrode, forming a color filter layer on an opposing substrate, forming a common electrode on the color filter layer, forming a first dielectric frame and a second dielectric frame on the common electrode to pass through a central portion of the first side electrode at both sides around the second side electrode, and forming a liquid crystal layer between the substrates.

25 Claims, 12 Drawing Sheets

U.S. PATENT DOCUMENTS

| | | | | |
|---|---|---|---|---|
| 5,249,070 A | | 9/1993 | Takano | 359/54 |
| 5,309,264 A | | 5/1994 | Lien et al. | 359/87 |
| 5,339,181 A | | 8/1994 | Kim et al. | 359/59 |
| 5,477,358 A | | 12/1995 | Rosenblatt et al. | 359/77 |
| 5,517,341 A | * | 5/1996 | Kim et al. | 349/42 |
| 5,517,342 A | | 5/1996 | Kim et al. | 359/59 |
| 5,574,582 A | | 11/1996 | Takeda et al. | 359/59 |
| 5,576,863 A | | 11/1996 | Aoki et al. | 359/76 |
| 5,602,662 A | | 2/1997 | Rosenblatt et al. | 349/130 |
| 5,608,556 A | | 3/1997 | Koma | 349/143 |
| 5,621,558 A | | 4/1997 | Shimada et al. | 349/130 |
| 5,623,354 A | | 4/1997 | Lien et al. | 349/124 |
| 5,666,179 A | | 9/1997 | Koma | 349/143 |
| 5,668,650 A | | 9/1997 | Mori et al. | 349/42 |
| 5,673,092 A | | 9/1997 | Horie et al. | 349/86 |
| 5,686,977 A | | 11/1997 | Kim et al. | 349/38 |
| 5,737,051 A | | 4/1998 | Kondo et al. | 349/141 |
| 5,748,276 A | | 5/1998 | Uno et al. | 349/144 |
| 5,767,926 A | | 6/1998 | Kim et al. | 349/38 |
| 5,777,701 A | | 7/1998 | Zhang | 349/44 |
| 5,777,711 A | | 7/1998 | Sugiyama | 349/143 |
| 6,157,428 A | * | 12/2000 | Koma | 349/138 |
| 6,256,080 B1 | * | 7/2001 | Colgan et al. | 349/129 |
| 6,285,431 B2 | * | 9/2001 | Lyu et al. | 349/143 |
| 6,462,798 B1 | * | 10/2002 | Kim et al. | 349/129 |
| 2001/0019388 A1 | * | 9/2001 | Kim et al. | 349/129 |
| 2001/0019389 A1 | * | 9/2001 | Lee et al. | 349/129 |
| 2001/0019391 A1 | * | 9/2001 | Kim et al. | 349/139 |

FOREIGN PATENT DOCUMENTS

| | | |
|---|---|---|
| EP | 0752611 A2 | 1/1997 |
| EP | 0752611 A3 | 11/1997 |
| EP | 0814142 A2 | 12/1997 |
| EP | 0854377 A2 | 7/1998 |
| EP | 0814142 A3 | 12/1998 |
| EP | 0884626 A2 | 12/1998 |
| EP | 0854377 A3 | 3/1999 |
| EP | 0884626 A3 | 3/2001 |
| GB | 2296810 A | 7/1996 |
| GB | 2321718 A | 8/1998 |
| GB | 2337843 A | 12/1999 |
| JP | 1149076 | 6/1989 |
| JP | 1149079 | 6/1989 |
| JP | 2294622 | 12/1990 |
| JP | 3261914 | 11/1991 |
| JP | 4067127 | 3/1992 |
| JP | 4261522 | 9/1992 |
| JP | 5297412 | 11/1993 |
| JP | 6002161 | 1/1994 |
| JP | 6194656 | 7/1994 |
| JP | 6194657 | 7/1994 |
| JP | 6281959 | 7/1994 |
| JP | 6258649 | 9/1994 |
| JP | 6273798 | 9/1994 |
| JP | 6301036 | 10/1994 |
| JP | 6347824 | 12/1994 |
| JP | 7013164 | 1/1995 |
| JP | 7013166 | 1/1995 |
| JP | 7028063 | 1/1995 |
| JP | 7036044 | 2/1995 |
| JP | 7043698 | 2/1995 |
| JP | 7043719 | 2/1995 |
| JP | 7064089 | 3/1995 |
| JP | 7181493 | 7/1995 |
| JP | 7199190 | 8/1995 |
| JP | 7230097 | 8/1995 |
| JP | 7311383 | 11/1995 |
| JP | 8022023 | 1/1996 |
| JP | 8076125 | 3/1996 |
| JP | 8101399 | 4/1996 |
| JP | 8146468 | 6/1996 |
| JP | 8220511 | 8/1996 |
| JP | 8220524 | 8/1996 |
| JP | 831915 | 11/1996 |
| JP | 9022025 | 1/1997 |
| JP | 9033890 | 2/1997 |
| JP | 9152583 | 6/1997 |
| JP | 9197420 | 7/1997 |
| JP | 9230360 | 9/1997 |
| JP | 9230387 | 9/1997 |
| JP | 9236821 | 9/1997 |
| JP | 9325373 | 12/1997 |
| JP | 10301112 | 11/1998 |
| JP | 10333180 | 12/1998 |
| JP | 11109355 | 4/1999 |
| JP | 11109356 | 4/1999 |
| JP | 11109356 | 4/1999 |
| JP | 11109358 | 4/1999 |
| JP | 11109362 | 4/1999 |
| JP | 11109391 | 4/1999 |
| JP | 11119198 | 4/1999 |
| JP | 11119209 | 4/1999 |
| JP | 11148078 | 6/1999 |
| JP | 11149093 | 6/1999 |
| JP | 11223807 | 8/1999 |
| JP | 11223808 | 8/1999 |
| WO | WO 9610774 | 4/1996 |

OTHER PUBLICATIONS

A. Lien et al; "TFT–Addressed Two–Domain TN VGA Displays Fabricated Using the Parallel–Fringe–Field Method"; SID '94 DIGEST; pp. 594–596.

N. Koma et al.; "No–Rub Multi–Domain TFT–LCD Using Surrounding–Electrode Method"; SID 95 DIGEST; Sanyo Electric Co., Ltd.; pp. 869–872.

H. Murai, et al; "Novel High Contrast Random and Controlled 4–Domain CTN–LCDs with Wide Viewing Angle"; Euro Display '96; pp. 159–162.

Y. Koike et al.; "A Vertically Aligned LCD Providing Super–High Image Quality"; Fujitsu Limited; IDW '97; pp. 159–162.

K. Ohmuro et al.; "Development of Super–High–Image–Quality Vertical–Alignment–Mode LCD"; Fujitsu Ltd.; SID '97 DIGEST; pp. 845–848.

N. Koma et al.; Development of a High–Quality TFT–LCD for Projection Displays; Sanyo Electric Co., Ltd.; SID '97 DIGEST; pp. 461–464.

* cited by examiner

MULTI-DOMAIN LIQUID CRYSTAL DISPLAY DEVICE AND METHOD FOR FABRICATING THE SAME

This application claims the benefit of Korean Patent Application No. 2000-35649, filed on Jun. 27, 2000, which is hereby incorporated by reference for all purposes as if fully set forth herein.

BACKGROUND OF THE INVENTION

1. Field of the Invention

The present invention relates to a display device, and more particularly, to a multi-domain liquid crystal display (LCD) device and a method for fabricating the same.

2. Discussion of the Related Art

A Cathode Ray Tube (CRT) is one of display devices mainly used in monitors of information terminals and measuring instruments including telelvision. However, it is difficult for a CRT to be adapted to miniaturization and to have light weight due to its weight and size.

A liquid crystal display (LCD) device having a small size, light weight and low power consumption has been actively developed to substitute for such a CRT. Recently, the liquid crystal display devices can be configured as a flat panel display device. Thus, demand of the LCD device is increasing.

Such an LCD device is based on electric optical characteristic of a liquid crystal injected within a panel unlike a plasma display panel (PDP) or a field emission display (FED), the LCD device does not itself emit light. Accordingly, to view a picture displayed in an LCD, a separate light source, i.e., a back light assembly is required for uniformly irradiating light onto a display panel.

Figure 1:
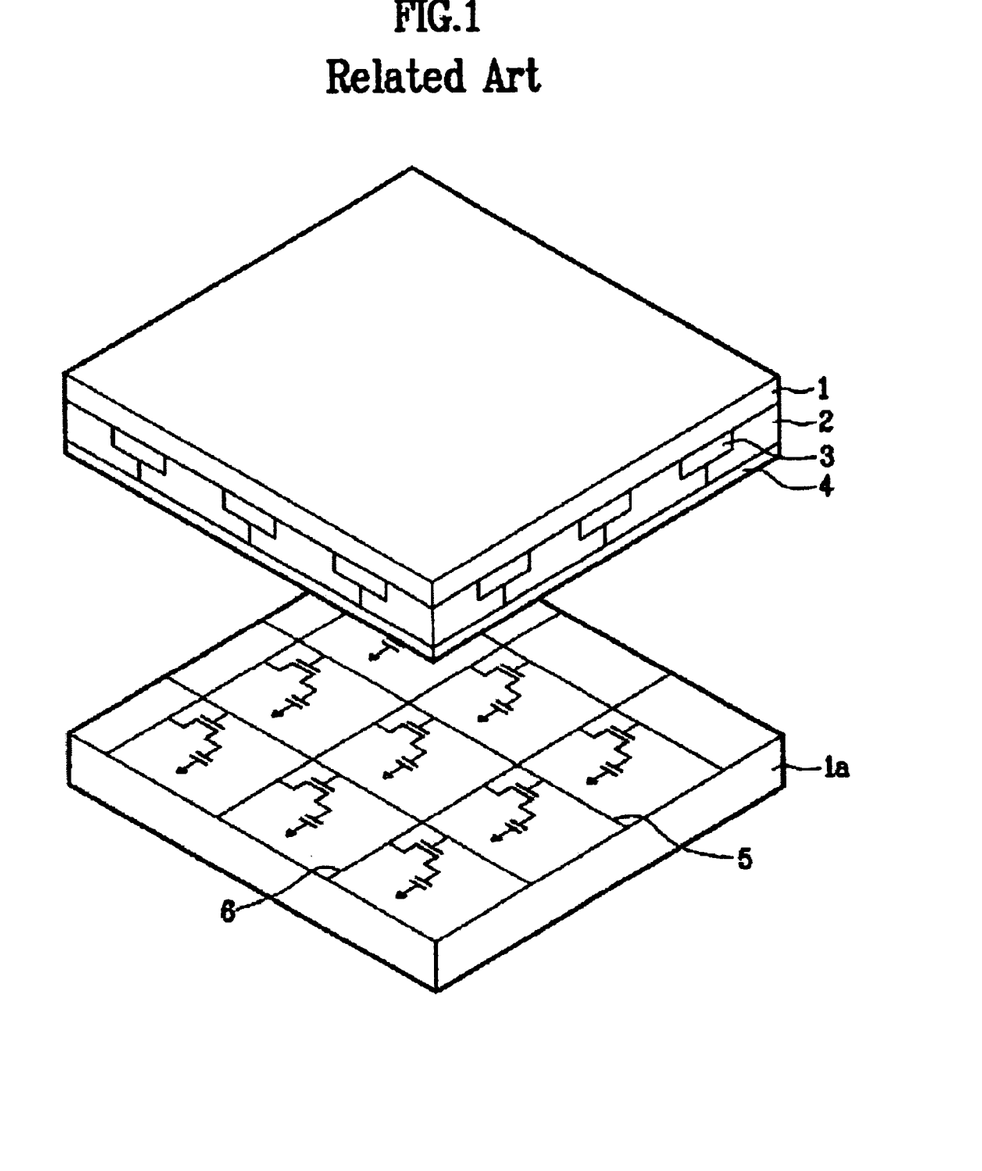
FIG. 1 is a schematic view showing a general LCD device.

FIG. 1 shows a general LCD. Referring to FIG. 1, the LCD includes a first substrate 1, a second substrate 1a, and a liquid crystal (not represented) injected and sealed between the first and second substrates 1 and 1a.

In more detail, on the first substrate 1, a color filter layer 2 is formed to display color, a black matrix layer 3 is formed to prevent light from being transmitted to a portion other than a pixel region of the second substrate, a common electrode 4 is formed to apply a common voltage Vcom to the panel.

On the second substrate 1a, a gate line 5 and a data line 6 are arranged to cross each other, so that a pixel region is formed in a matrix arrangement. A thin film transistor (TFT) and a pixel electrode are formed in each pixel region.

Currently, one of the most widely used liquid crystal displays is a twisted nematic (TN) mode LCD. The TN-mode LCD is constructed in a manner such that electrodes are formed on each of the two substrates, respectively. And liquid crystal molecules interposed between them are twisted in a spiral shape, parallel to the substrates and having a predetermined pitch.

In this structure, a voltage is applied to the electrodes to drive a liquid crystal director. However, the TN-mode LCD has poor contrast because light is not completely blocked in an OFF-state. Furthermore, it generates a gray inversion so that a contrast ratio varies with angle to invert luminance of medium gray, thereby causing difficulty in obtaining stabilized images. Moreover, the TN-mode LCD does not have satisfactory viewing angle characteristic.

A variety of research has been conducted in an attempt to solve the narrow viewing angle problem of the LCD. The research includes a film-compensated mode for compensating a viewing angle with a compensation film, a multi-domain mode in which pixels are divided into multiple domains and each domain has a different main viewing angle direction to compensate the viewing angle, an in-plane switching mode in which two electrodes are placed on the same substrate to generate a horizontal electric field, and an OCB (optically compensated birefringence) mode.

Meanwhile, a vertical alignment (VA) mode LCD uses a negative liquid crystal having a negative dielectric constant anisotropy and a vertical alignment film. In this type of the LCD, the longer sides of the liquid crystal molecules are arranged perpendicular to the plane of the alignment film when no voltage is applied, and a polarizing axis of a polarizer attached onto the substrate is perpendicular to the longer sides of the liquid crystal molecules, to produce a normally black mode.

On the other hand, when voltage is applied to the LCD, the longer sides of the molecules are moved from the direction perpendicular to the alignment film plane toward the alignment film plane to transmit the light according to the characteristic that the negative liquid crystal molecules, which are oriented and inclined with respect to the electric field.

The VA-mode LCD is superior to the TN-mode LCD in terms of contrast ratio, response time, and so on. Furthermore, in the case where a direction in which the liquid crystal molecules fall is divided into a predetermined number of multiple directions and a compensated film is employed, a viewing angle can be effectively realized.

Moreover, there have been recently proposed PVA (patterned vertical alignment) and MVA (multi-domain vertical alignment) in which structures such as side electrodes and ribs or slits are formed on the substrate to distort the electric field applied to the liquid crystal layer, instead of alignment treatment, thereby locating the liquid crystal molecular director in a desired direction.

Figure 2A:
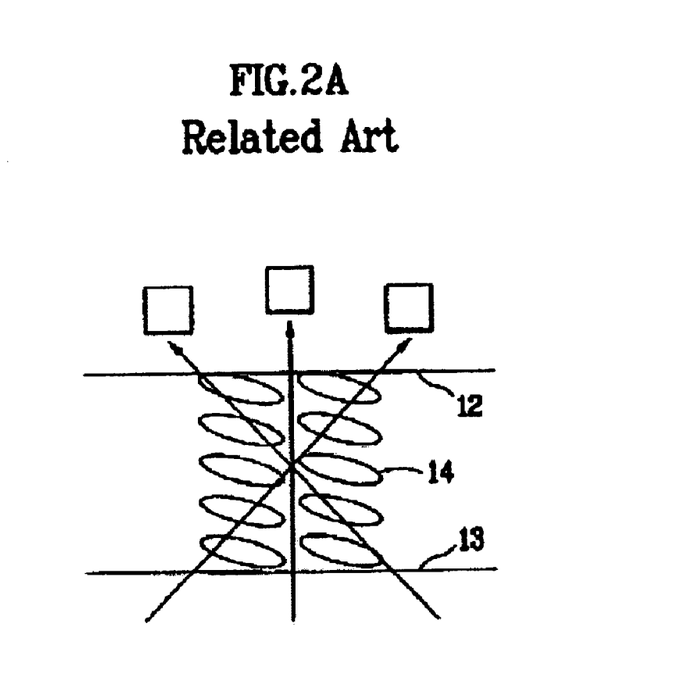
FIGS. 2A to 2C are cross-sectional views for a conventional TN mode LCD.
Figure 2B:
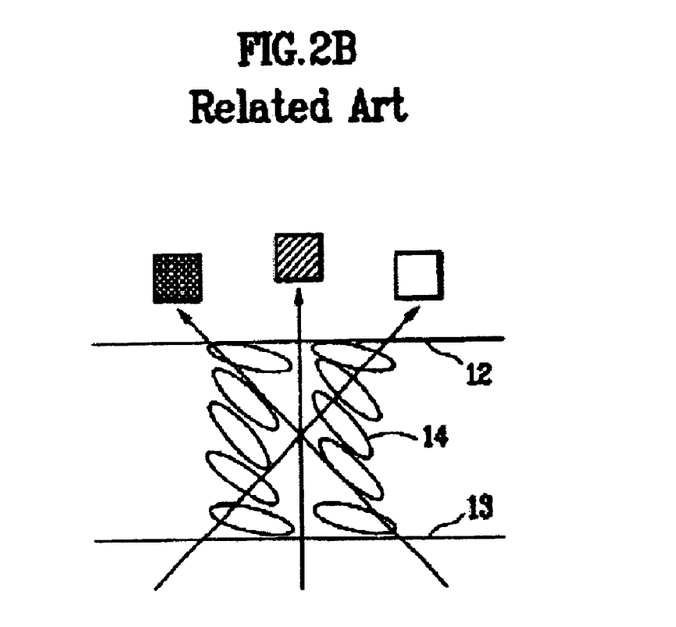
Figure 2C:
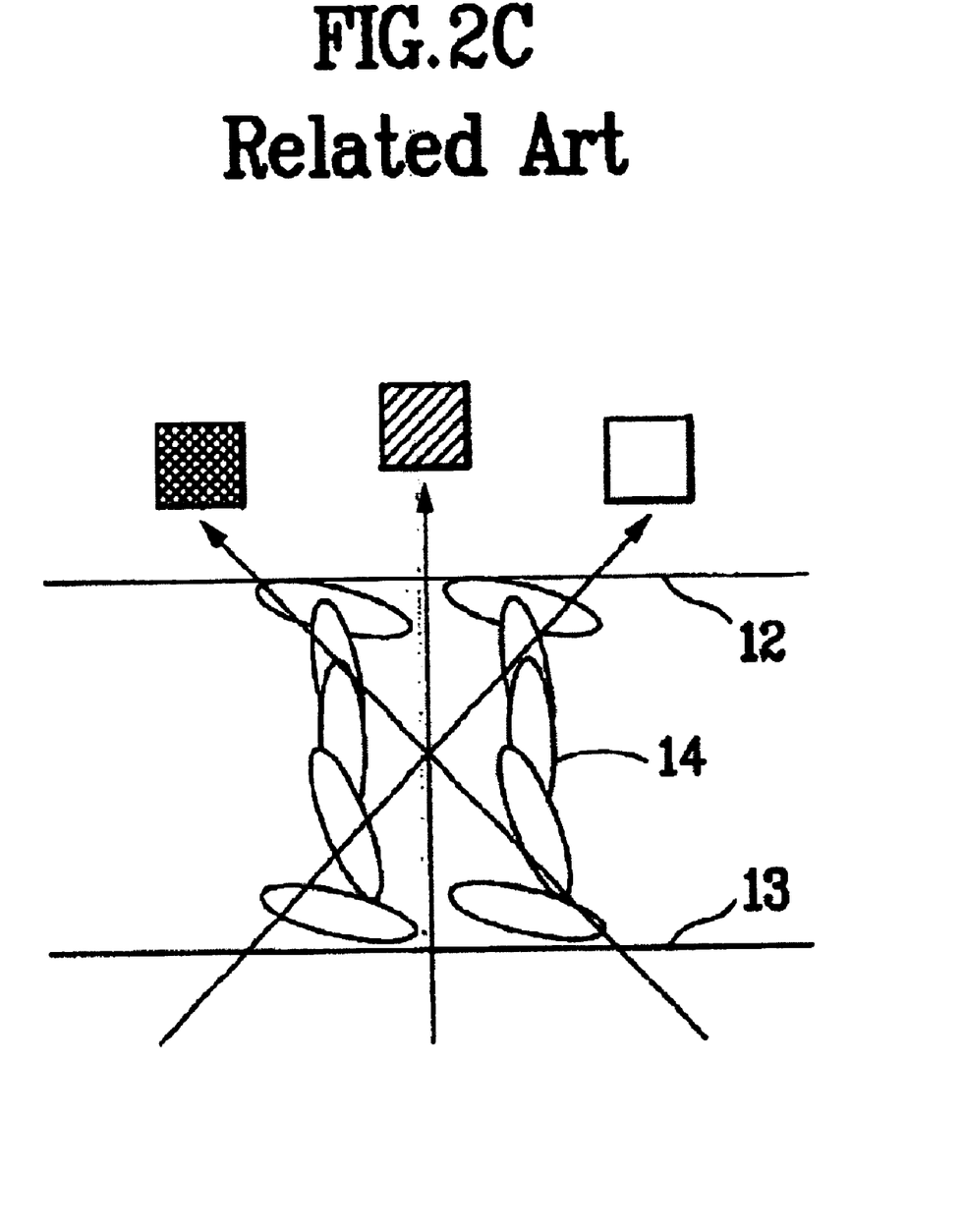
Figure 3A:
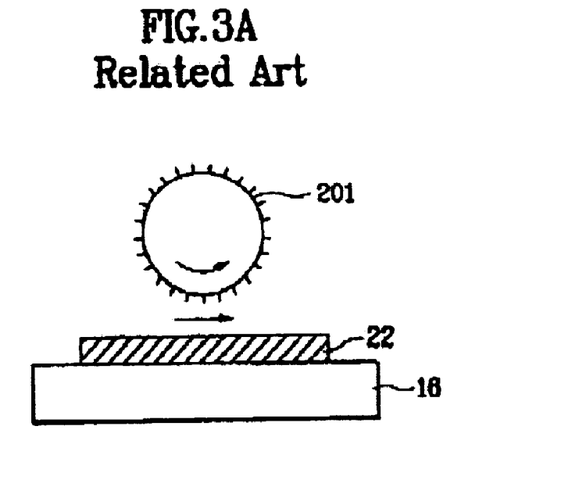
FIGS. 3A to 3C are cross-sectional views to show an alignment division according to a rubbing process.
Figure 3B:
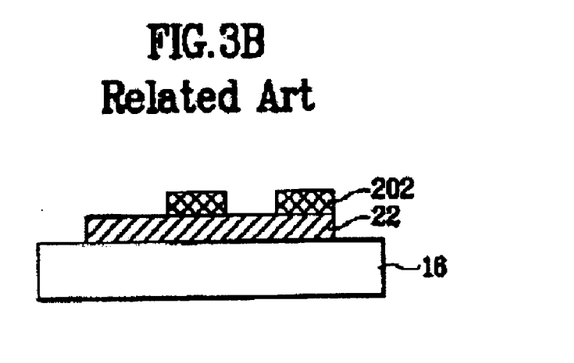
Figure 3C:
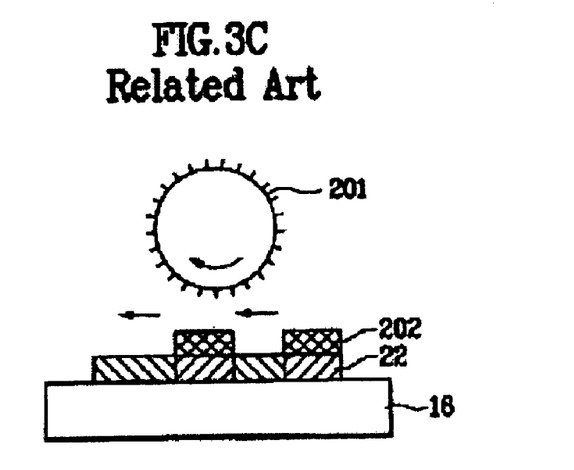

FIGS. 2A to 2C are cross-sectional views for explaining problems of the TN LCD, while FIGS. 3A to 3C are cross-sectional views for explaining an alignment direction according to a rubbing process. Although the TN LCD among TFT LCDs has advantages of excellent contrast and satisfactory color reproducibility, it has a disadvantage of a narrow viewing angle.

Referring to FIG. 2A, in a normally white mode TN LCD, liquid crystal molecules 14 are aligned in the same direction with a slight inclination (about 1 to 5°) when no voltage is applied between two substrates 12 and 13 of the LCD. In this state, light is seen nearly white in any azimuth. In case of application of a voltage higher than a threshold value, as shown in FIG. 2C, intermediate liquid crystal molecules 14 except for those located near the substrates 12 and 13 are aligned in a vertical direction. Incident linearly polarized light is therefore blocked, but not twisted. At this time, light obliquely incident on a screen (panel) has the direction of polarization thereof twisted to some extent because it passes obliquely through the liquid crystal molecules 14 aligned in the vertical direction. The light is therefore seen halftone (gray), but not perfectly black.

As shown in FIG. 2B, in the state in which an intermediate voltage lower than the voltage applied in the state shown in FIG. 2C is applied, the liquid crystal molecules 114 near the alignment layers are aligned in a horizontal direction but the liquid crystal molecules 14 in the middle parts erect themselves halfway. The birefringent characteristic of the liquid crystal is lost to some extent. This causes transmittance to deteriorate and cause halftone (gray).

However, this refers only to the light incident perpendicularly on the liquid crystal panel. The obliquely incident light is seen differently, that is, light is seen differently depending on whether it is seen from the left or right side of the drawing. As illustrated, the liquid crystal molecules 14 are aligned mutually parallel relative to the light propagating from the light below to left above.

The liquid crystal hardly exerts a birefringence effect. Therefore, when the panel is seen from the left side, it is seen black. By contrast, the liquid crystal molecules 14 are aligned vertically relative to light propagating from light below to right above. The liquid crystal exerts a great birefringence effect relative to incident light, and the incident light is twisted. This results in nearly white display. Thus, the most critical drawback of the TN LCD is that a display state varies with a viewing angle.

It is known that a viewing angle of the liquid crystal display device (LCD) in the TN mode can be improved by setting orientation directions of the liquid crystal molecules inside pixels to a plurality of mutually different directions. Generally, the orientation direction of the liquid crystal molecules (pretilt angles) which keep in contact with a substrate surface in the TN mode are restricted by the direction of a rubbing treatment applied to the alignment film.

The rubbing treatment is a process in which the surface of the alignment film is rubbed in one direction by a cloth such as rayon, so that the liquid crystal molecules are orientated in the rubbing direction. Therefore, a viewing angle can be improved by making different rubbing directions inside the pixels.

FIGS. 3A to 3C show a method of making a different rubbing direction inside pixels. As shown in the drawing, an alignment film 22 is formed on a glass substrate 16. For simplicity, electrodes and other elements are omitted from the drawing. The alignment film 22 is then brought into contact with a rubbing roll 201 to perform a rubbing treatment in one direction.

Next, a photoresist is applied to the alignment film 22 and a predetermined pattern is exposed and developed by photolithography. As a result, a layer 202 of the photo-resist which is patterned is formed as shown in the drawing. Then, the alignment film 22 is brought into contact with the rubbing roll 201 that is rotating to the opposite direction to the above, so that only the open portions of the pattern are rubbed.

In this way, a plurality of regions that are subjected to the rubbing treatment in different directions are formed in the pixel, and there are a plurality of orientation directions of the liquid crystal inside the pixel. The rubbing treatment can be done in arbitrarily different directions when the alignment film 22 is rotated relative to the rubbing roll 201.

Although the rubbing treatment has gained a wide application, it is the treatment that rubs and consequently damages the surface of the alignment film. Also, in the rubbing treatment problems caused by dust are likely to occur. Another method of restricting a pretilt angle of the liquid crystal molecules in the TN mode involves a concave-convex pattern on an electrode. The liquid crystal molecules in the proximity of the electrodes are orientated along the surface having concave-convex pattern.

In addition, in the VA LCD, in which a vertical alignment and a negative liquid crystal are applied, the alignment direction of the liquid crystal molecules can be divided in order to improve viewing angle. In this case, it is preferable to increase the viewing angle corresponding to an in-plane switching (IPS) mode, while maintaining a contrast ratio and a response time as high as those of the conventional LCD.

It is possible to make domains in the VA mode uniform by arranging the liquid crystal molecules obliquely at the initial stage to be uniformly oriented in multiple directions in each pixel when an electric field is applied thereto. Here, the domain of at least one substrate must be divided, and an inclined surface should be formed on the substrate having the divided domains. The inclined surface includes one slanted nearly perpendicular to the substrate. The vertical alignment film is not required to be rubbed in this case.

The liquid crystal molecules are aligned perpendicular to the substrate when no voltage is applied to the VA LCD. However, they have a slope to the substrate due to the inclined surface. Upon application of the voltage, the liquid crystal molecules are tilted due to intensity of the electric field. At this time, the tilt angle due to the electric field has a rotation direction of 360° because the electric field is created perpendicular to the substrate.

Recently, an LCD has been proposed, in which a liquid crystal is not aligned and is driven by auxiliary electrodes insulated from pixel electrodes.

Figure 4:
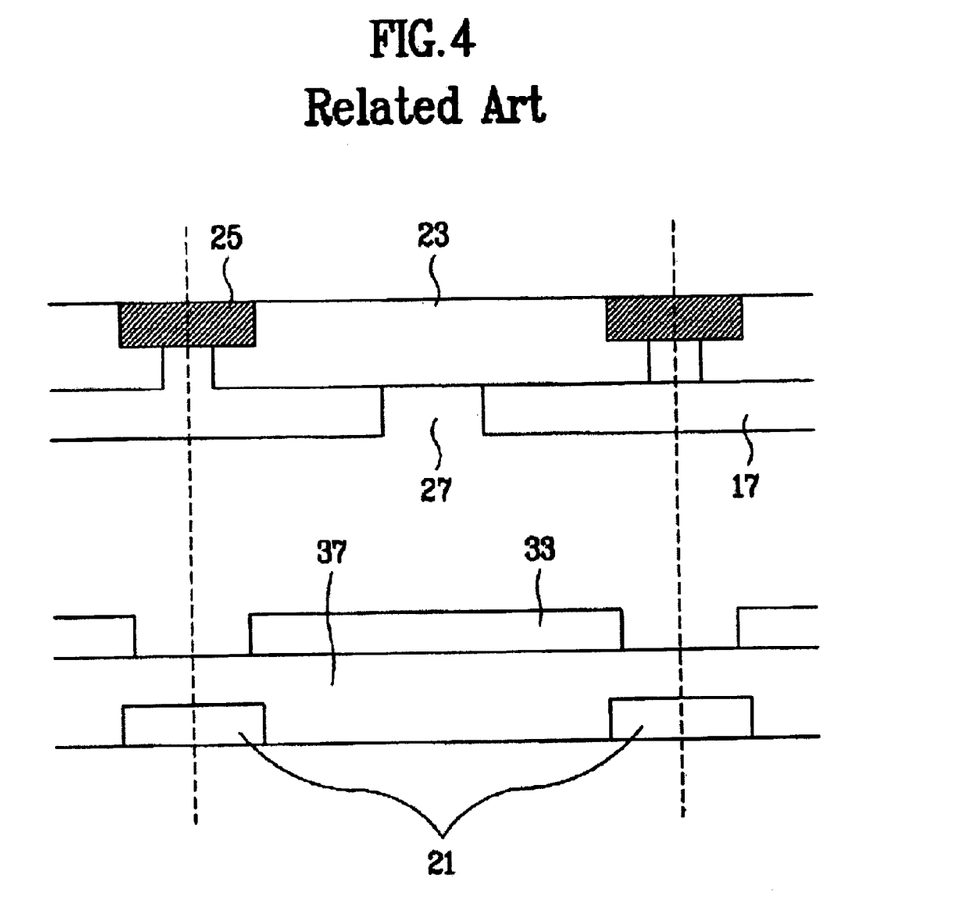
FIG. 4 is a sectional view showing a unit pixel of a related art multi-domain LCD device.

FIG. 4 is sectional view of pixel unit of a related art LCD.

A related art LCD includes a first substrate and a second substrate, a plurality of data lines and gate lines arranged in first and second directions on the first substrate to divide the first substrate into a plurality of pixel regions, a thin film transistor (TFT) formed on each pixel region of the first substrate and composed of a gate electrode, a gate insulating film, a semiconductor layer, an ohmic contact layer and source/drain electrodes, a passivation film 37 formed over the whole first substrate, a pixel electrode 33 formed on the passivation film 37 to connect with a drain electrode, and an auxiliary electrode 21 formed on the gate insulating film to partially overlap the pixel electrode 33.

On the second substrate, a light shielding layer 25 is formed to shield the light leaked from the gate and data lines and the TFT, a color filter layer 23 is formed on the light shielding layer 25, a common electrode 17 is formed on the color filter layer 23, and a liquid crystal layer is formed between the first and second substrates.

An open area 27 of the common electrode 17 and the auxiliary electrode 21 formed to surround the pixel electrode 33 distort the electric field applied to the liquid crystal layer, so that liquid crystal molecules in a unit pixel are driven variously. This means that when a voltage is applied to the LCD, dielectric energy due to the distorted electric field arranges the liquid crystal directors in needed or desired positions.

In the related art LCD, however, the common electrode or the pixel electrode requires the open area to obtain a multi-domain effect. Accordingly, the manufacturing process of the LCD further includes a step of patterning the electrodes.

Also, if the electrodes do not have the open area or the width of the open area is narrow, the electric field distortion needed for domain division to divide the pixel region becomes weak. Accordingly, the time needed to stabilize the liquid crystal directors increases, and luminance is reduced due to disclination.

SUMMARY OF THE INVENTION

Accordingly, the present invention is directed to a multi-domain LCD device and a method for fabricating the same that substantially obviates one or more of the problems due to limitations and disadvantages of the related art.

An object of the present invention is to provide a multi-domain LCD device and a method for fabricating the same, in which an alignment direction of liquid crystal molecules is controlled to improve response time and picture quality.

Additional features and advantages of the invention will be set forth in the description which follows, and in part will be apparent from the description, or may be learned by practice of the invention. The objectives and other advantages of the invention will be realized and attained by the scheme particularly pointed out in the written description and claims hereof as well as the appended drawings.

To achieve these and other advantages and in accordance with the purpose of the present invention, as embodied and broadly described, a multi-domain LCD device according to the present invention includes: first and second substrates having pixel regions; a pixel electrode formed on the second substrate; a first side electrode formed along the periphery of the pixel electrode; a second side electrode formed in a diagonal direction of the pixel electrode; and first and second dielectric frames respectively formed in the same direction as the second side electrode on the first substrate corresponding to the second side electrode.

In another aspect, a method for fabricating a multi-domain LCD device according to the present invention includes the steps of: forming a first side electrode on a substrate in a matrix arrangement; forming a second side electrode to connect both ends with a corner portion of the first side electrode; forming a pixel electrode having a plurality of open regions at an upper side of the second side electrode; forming a color filter layer on an opposing substrate; forming a common electrode on the color filter layer; forming a first dielectric frame and a second dielectric frame on the common electrode to pass through a central portion of the first side electrode at both sides around the second side electrode; and forming a liquid crystal layer between the substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A multi-domain LCD device according to the first embodiment of the present invention will now be described with reference to the accompanying drawings.

Figure 5:
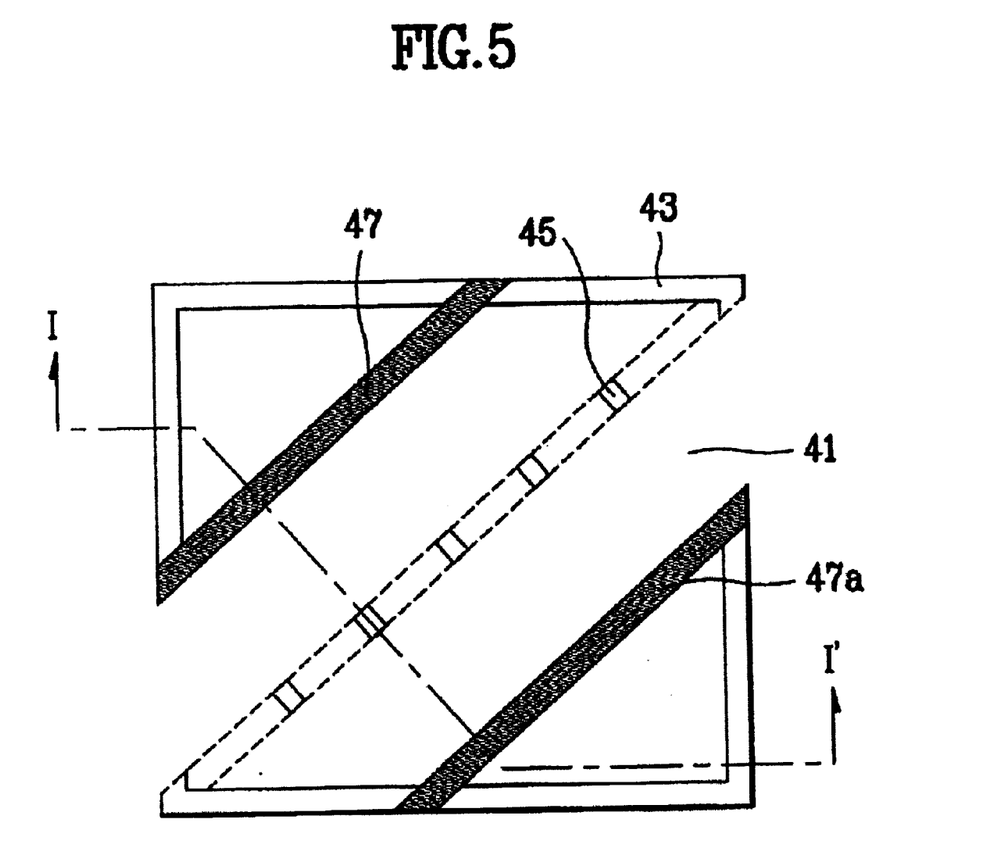
FIG. 5 is a plan view showing a multi-domain LCD device according to the first embodiment of the present invention.
Figure 6A:
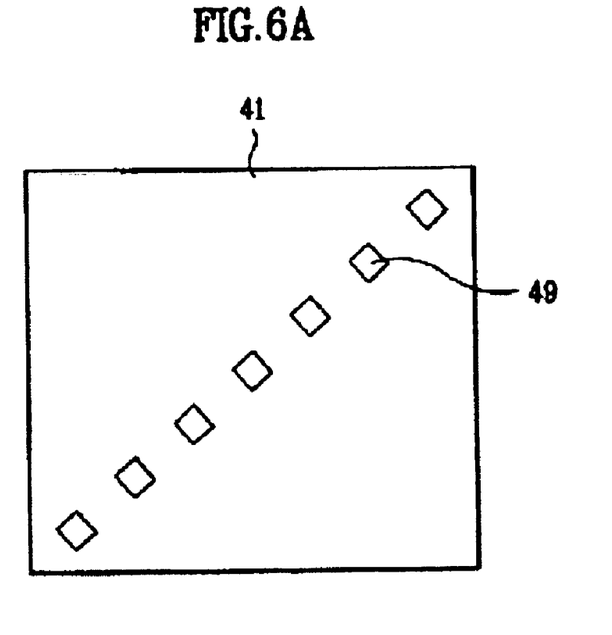
FIGS. 6A and 6B are partially detailed views of FIG. 5.

FIG. 5 is a plan view showing a multi-domain LCD device according to the first embodiment of the present invention, and FIG. 6A shows a pixel electrode of FIG. 5 in more detail.

As shown in FIG. 5, in the first embodiment of the present invention, a first side electrode 43 is formed along the periphery of a pixel electrode 41, and a second side electrode 45 is formed across the pixel electrode 41 diagonally to connect with the first side electrode 43. First and second dielectric frames 47 and 47a are formed in the same direction as the second side electrode 45 at both sides of the second side electrode 45.

As shown in the figures, the second side electrode 45 is formed in a diagonal direction of the pixel electrode so that liquid crystal molecules are uniformly arranged towards the second side electrode 45. The first and second dielectric frames 47 and 47a are formed on an opposing substrate in a position corresponding to both sides of the second side electrode 45, so that the liquid crystal molecules are prevented from being abnormally oriented due to strong signal distortion at the central portion of the second side electrode 45.

The first and second dielectric frames 47 and 47a are dielectrics, and include a material such as acrylic or Benzocyclobutene(BCB) and black resin. Also, the first and second dielectric frames 47 and 47a are formed to cross the central portion of the first side electrode 43.

Additionally, a polymer is formed on at least one of the first substrate 40 and the second substrate 40a to form a phase difference film (not shown). The phase difference film is a negative uniaxial film having one axis and acts to compensate a viewing angle of a user.

Therefore, a region having no gray inversion is expanded, contrast ratio in a tilt direction increases, and multiple domain are formed in the liquid crystal within one pixel. Thus, a viewing angle in left and right directions can effectively be compensated.

In addition to the negative uniaxial film, a negative biaxial film having two axes may be formed as the phase difference film. The negative biaxial film having two axes can obtain a viewing angle characteristic wider than the negative uniaxial film.

After attaching the phase difference film, a polarizer(not shown) is attached on the substrate. At the time, the polarizer may be formed integrally with the phase difference film.

Meanwhile, the pixel electrode 41, as shown in FIG. 6A, has at least one open region 49 in a diagonal direction. The open regions 49 are formed to effectively control electric field that occurs between the pixel electrode 41 and the second side electrode 45, which is used to control the alignment direction of the liquid crystal molecules.

Figure 6B:
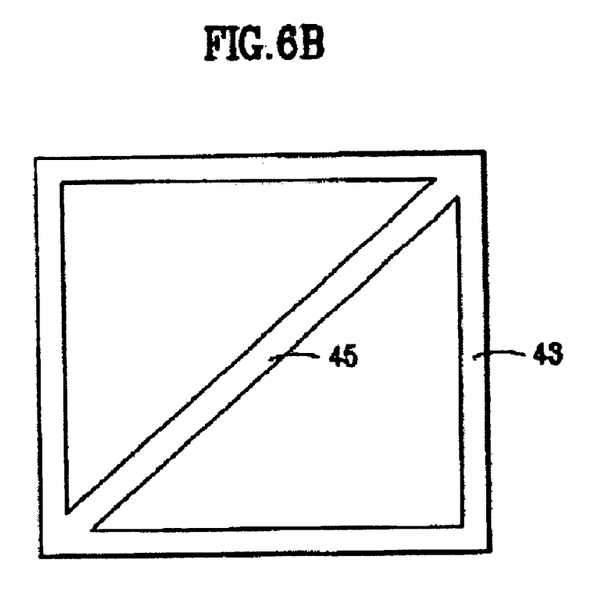

FIG. 6B shows the first side electrode 43 and the second side electrode 45. Referring to FIG. 6B, the first and second electrodes 43 and 45 are integrally formed.

Figure 7:
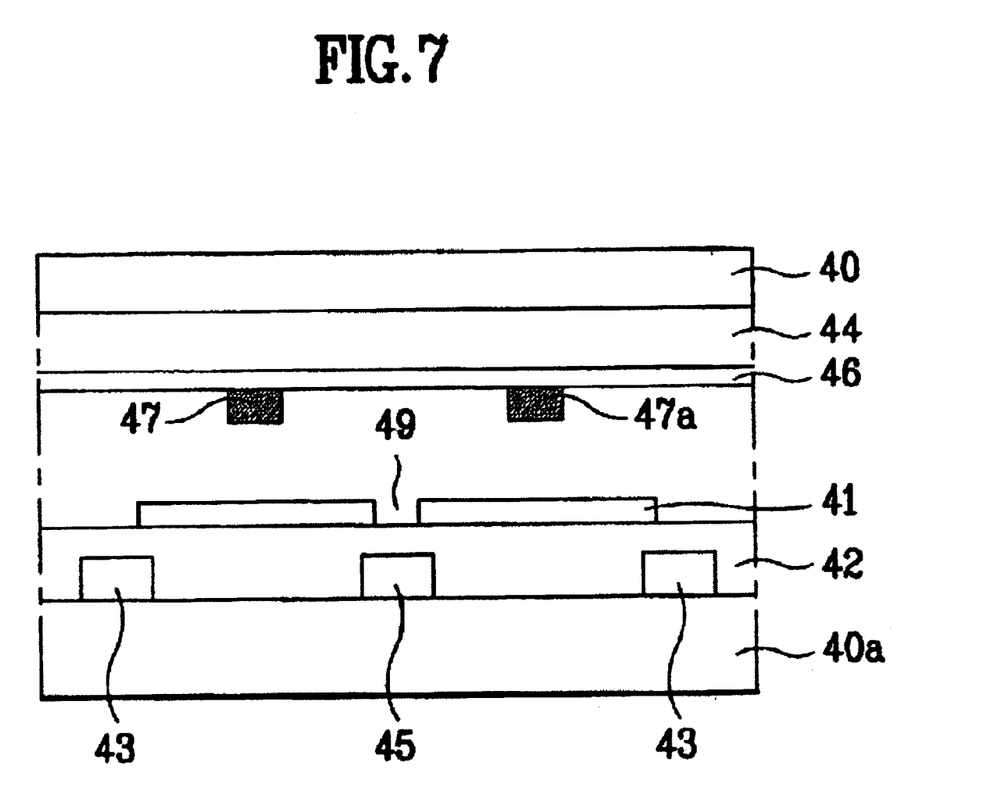
FIG. 7 is a sectional view taken along line I–I' of FIG. 5.

FIG. 7 is a sectional view taken along line I–I' of FIG. 5.

As shown in FIG. 7, a color filter layer 44 is formed on the first substrate 40 to display color, a common electrode 46 is formed on the color filter layer 44 to apply a common voltage Vcom to the pixel electrode, and first and second dielectric frames 47 and 47a are formed on the common electrode 46 at constant intervals.

The first and second side electrodes 43 and 45 are formed on the second substrate 40a to control the alignment direction of the liquid crystal molecules. An insulating film 42 is formed on an entire surface including the first and second side electrode 43 and 45. A pixel electrode 41 is formed on the insulating film 42, and has an open region 49 above the second side electrode 45.

In the aforementioned multi-domain LCD device according to the first embodiment of the present invention, the second side electrode 45 is formed to induce strong electric field in a diagonal direction of the pixel electrode, so that the liquid crystal molecules are uniformly arranged by the strong electric field of the first and second side electrodes 43 and 45.

Also, the first dielectric frame 47 and the second dielectric frame 47a are formed on the first substrate 40 in the same direction as the second side electrode 45, so that the liquid crystal molecules are prevented from being abnormally arranged in the central portion of the first side electrode 43 due to electric field distortion.

Accordingly, all the liquid crystal molecules within the pixel electrode are uniformly arranged towards the second side electrode 45.

The method for fabricating the multi-domain LCD device according to the first embodiment of the present invention will now be described.

Figure 8A:
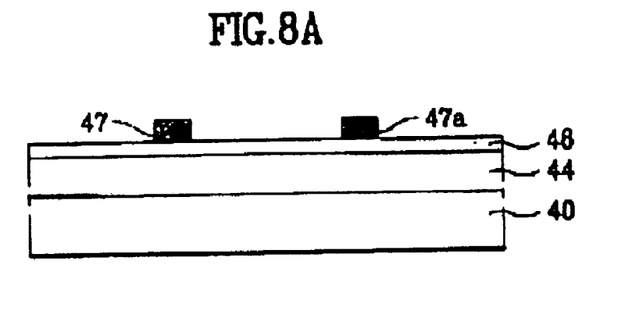
FIGS. 8A to 8C are sectional views of fabricating process steps of a multi-domain LCD device according to the first embodiment of the present invention.
Figure 8B:
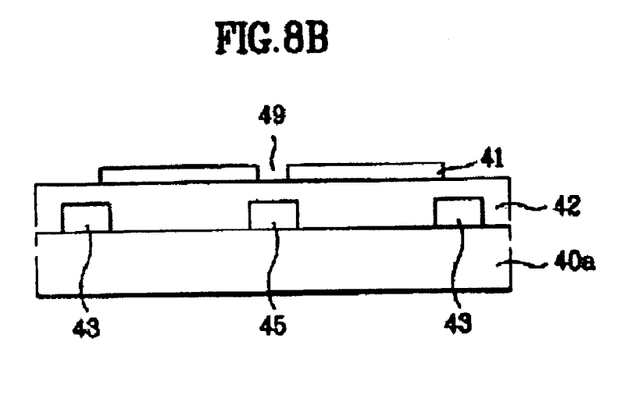
Figure 8C:
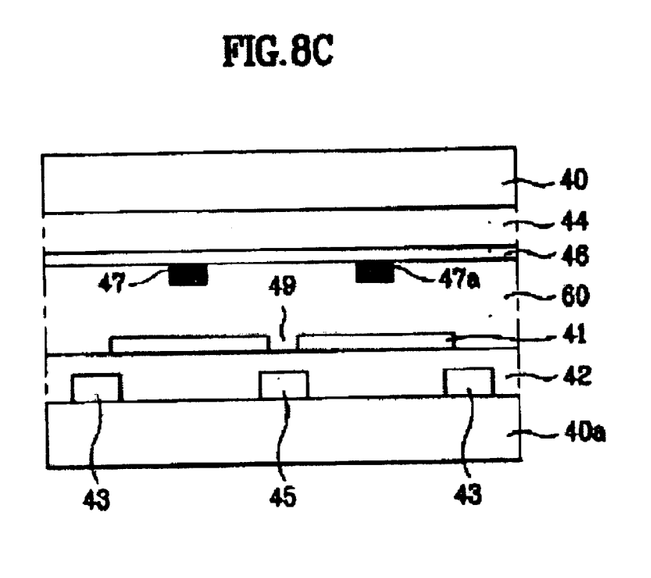

FIGS. 8A to 8C are sectional views of fabricating process steps of a multi-domain LCD device according to the first embodiment of the present invention.

As shown in FIG. 8A, the color filter layer 44 is formed on the first substrate 40 to display color, and the common electrode 46 is formed on the color filter layer 44 to apply the common voltage to the pixel electrode 41. Also, the first and second dielectric frames 47 and 47a are formed on the common electrode 46 at constant intervals.

As shown in FIG. 8B, the first and second side electrodes 43 and 45 are formed on the second substrate 40a to control the alignment direction of the liquid crystal molecules. The insulating film 42 is formed on the entire surface including the first and second side electrodes 43 and 45. The pixel electrode 41 having the open region 49 at the upper side of the second side electrode 45 is formed on the insulating film 42.

Subsequently, as shown in FIG. 8C, the liquid crystal layer 60 is formed between the first and second substrates 40 and 40a. Thus, the fabrication process of the multi-domain LCD device according to the first embodiment of the present invention is completed.

The first dielectric frame 47 and the second dielectric frame 47a are formed in the same direction as the second side electrode 45 so that the liquid crystal molecules are prevented from being abnormally arranged due to electric field distortion in the central portion of the first side electrode 43.

A multi-domain LCD device according to the second embodiment of the present invention will be described in more detail.

In the multi-domain LCD device according to the second embodiment of the present invention, a region where electric field distortion is converged in the first side electrode formed along the periphery of the pixel electrode is partially opened to minimize disclination therein. Also, it is intended to improve aperture improves by the area of the open region.

Figure 9:
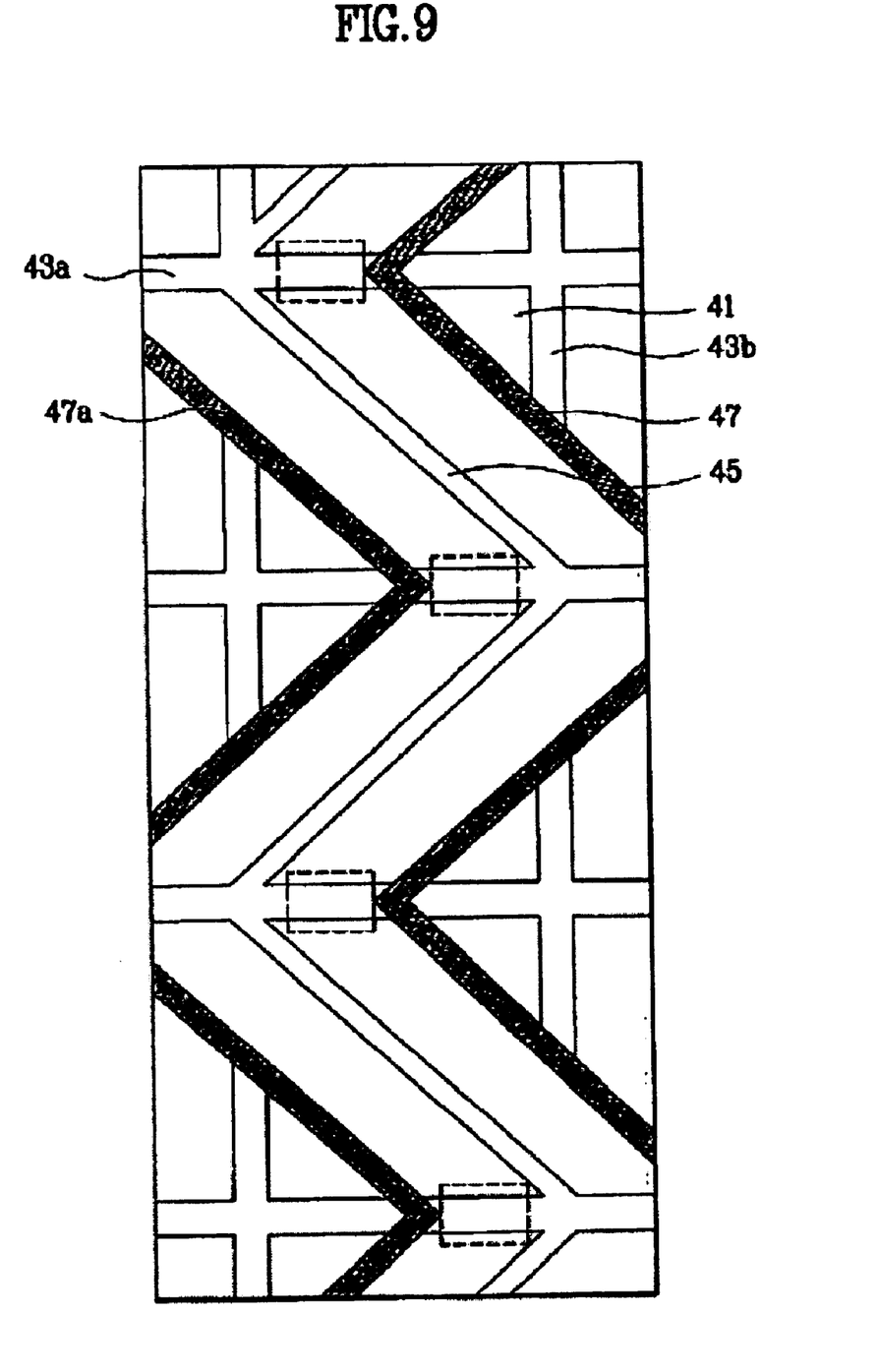
FIG. 9 is a plan view showing a multi-domain LCD device according to the second embodiment of the present invention.
Figure 10:
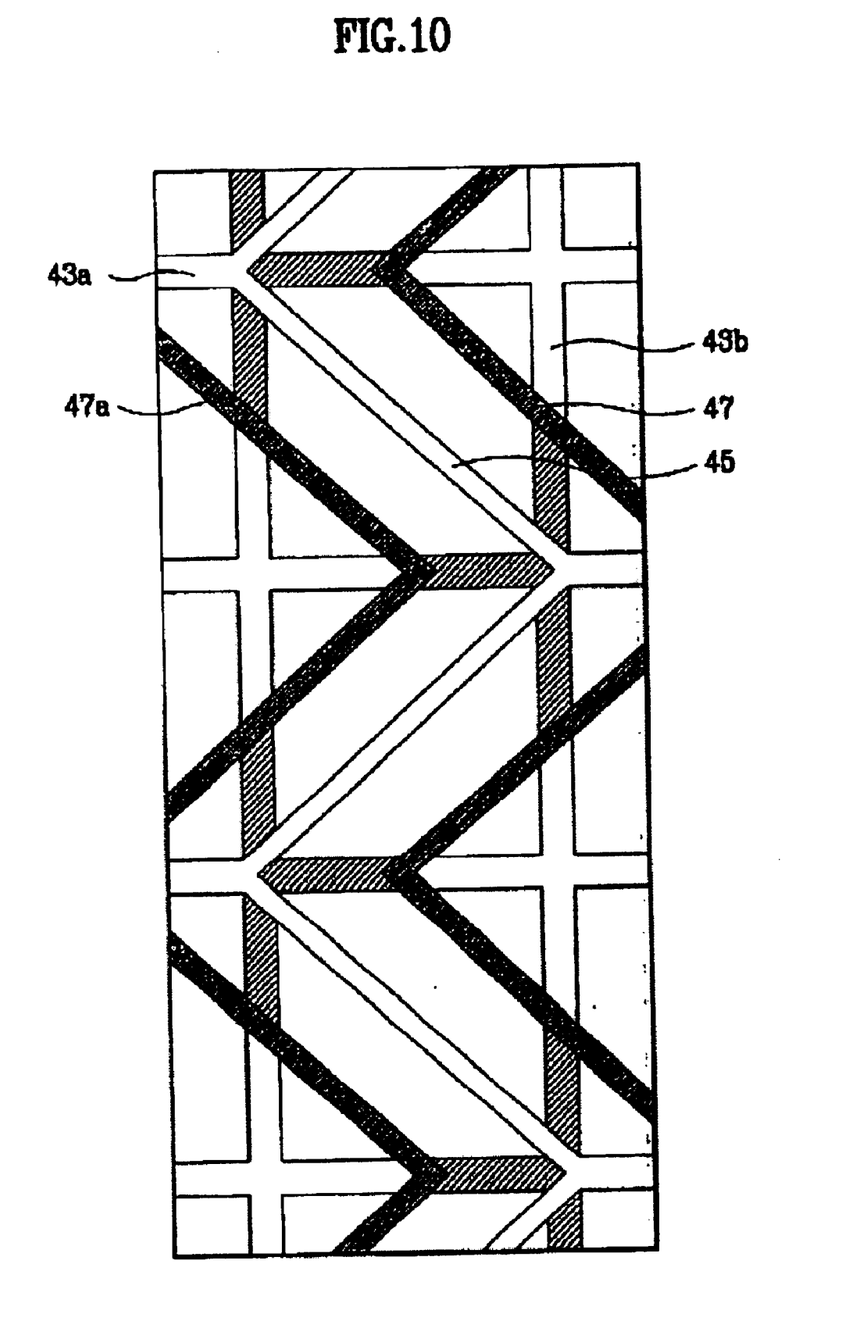
FIG. 10 is a partially detailed view showing an open region of a first side electrode.

FIG. 9 is a plan view showing a multi-domain LCD device according to the second embodiment of the present invention, in which the first side electrode is partially opened, and FIG. 10 shows a portion where the first side electrode is to be substantially opened.

As shown in FIG. 9, the first side electrode 43 is formed in a matrix arrangement, and regions of a matrix arrangement are defined by the first side electrode 43. The pixel electrode 41 is formed on the matrix regions. The second side electrode 45, both edges of which are connected with the first side electrode 43, is formed across the matrix regions in a diagonal direction.

The second side electrode 45 is formed in a zig-zag pattern over the matrix regions. For instance, the second side electrode 45 formed across one of the matrix regions and the second side electrode 45 formed across another region adjacent to the one region have a zig-zag pattern. This is to obtain a multi-domain by varying alignment directions of the liquid crystal molecules via the second side electrode 45.

The edges of the second side electrode 45 are connected with the first side electrode of a first direction 43a (horizontal direction) and the first side electrode of second direction 43b (vertical direction). At least one of the first side electrode of the first direction 43a and the first side electrode of the second direction 43b, which are adjacent to the edges of the second side electrode 45, is opened to be disconnected from the second side electrode 45.

If the first side electrode 43 is electrically connected with the second side electrode 45 at the edges, electric field distortion may occur in different directions. Accordingly, the first side electrode 43 is partially disconnected such that the first side electrode 43 is not electrically disconnected from the second side electrode 45.

In other words, in FIG. 9, some of the first side electrodes 43 are not opened (dotted line). This is because that the second side electrodes 45 should form an electrical path without disconnection (for reference, hatched portions of FIG. 10 are opened).

If the first side electrode 43 corresponding to the dotted line of FIG. 9 is opened, the electrical path between the first side electrode 43 and the second side electrode 45 is disconnected. In this case, it is difficult to distort the electric field using the first and second side electrodes 43 and 45. For this reason, it is impossible to control the alignment direction liquid crystal molecules through the electric field distortion using the side electrodes, thereby failing to obtain a multi-domain. Accordingly, it is required that the electrical path between the first side electrode 43 and the second side electrode 45 is not disconnected.

If some of the first side electrode 43 is not disconnected, a signal is distorted in different directions in a region where the first and second side electrodes converge. For this reason, disclination is caused, and aperture ratio is decreased due to the side electrodes.

Therefore, as shown in FIG. 9, some of the first side electrode 43 are opened in a region where the first side electrode 43 and the second side electrode 45 converge, such that the side electrodes are not electrically are not disconnected.

Such configuration prevents signal distortion in different directions from being generated.

As a result, the electric field distortion is formed in a direction of 45° and 135° so as to minimize disclination in the region where the side electrodes are converged.

Figure 11:
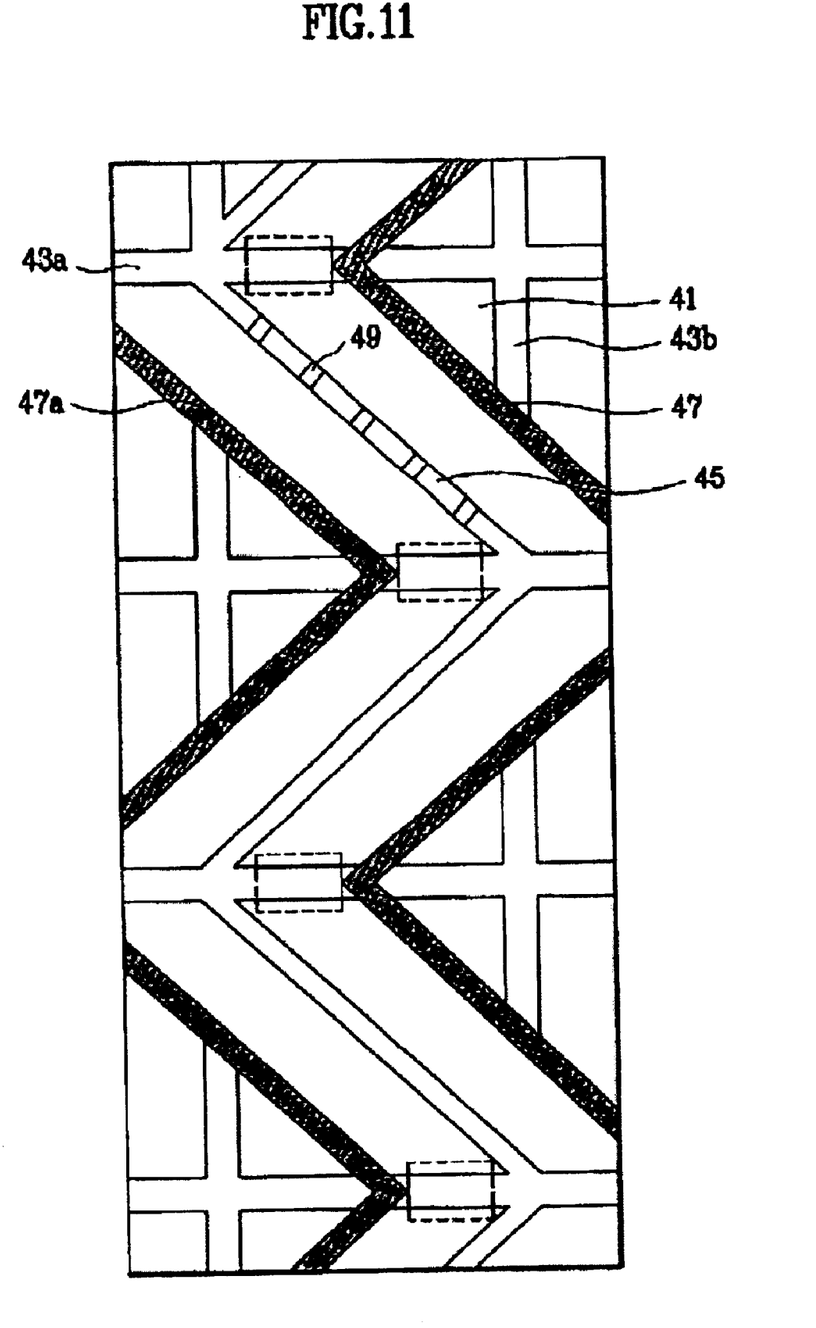
FIG. 11 is a partially detailed view showing an open region of the first side electrode and open regions in the pixel electrode.

For reference, an insulating film (not shown) is formed on the first and second side electrodes 43 and 45, and the pixel electrode 41 is formed on the insulating film. As shown in FIG. 11, and discussed above with regard to FIG. 6A, in one embodiment of the present invention, the pixel electrode 41 has a plurality of open regions 49 above a portion of the second side electrode 45, and the first side electrode 43 is substantially opened.

As aforementioned, the multi-domain LCD device and the method for fabricating the same have the following advantages.

Since the side electrodes are formed in a diagonal direction of the pixel region, as well as at the periphery of the pixel electrode, the liquid crystal is uniformly arranged to decrease the time needed to stabilize the liquid crystal directors, thereby decreasing response time and minimizing disclination.

Since two dielectric frames are formed to correspond to the pixel region, the liquid crystal molecules are uniformly arranged in a diagonal direction of the pixel region through strong electric field distortion, thereby decreasing response time and minimizing disclination.

Finally, the side electrodes of the portion where the electric field distortion converge are opened so as not to generate the electric field in different directions. Thus, it is possible to minimize disclination and at the same time improve an aperture ratio corresponding to the opened region, thereby improving picture quality.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A multi-domain LCD device, comprising;
   first and second substrates;
   a pixel electrode formed on the second substrate;
   a first side electrode formed along a periphery of the pixel electrode;
   a second side electrode formed diagonally on the pixel electrode; and
   first and second dielectric frames on the first substrate, the first and second dielectric frames corresponding to sides of the second side electrode.

2. The multi-domain LCD device of claim 1, wherein the first side electrode and the second side electrode are electrically connected with each other.

3. The multi-domain LCD device of claim 1, further comprising an insulating film formed on the first and second side electrodes, the pixel electrode being formed on the insulating film.

4. The multi-domain LCD device of claim 1 wherein the first and second dielectric frames are formed in the same direction as the second side electrode.

5. The multi-domain LCD device of claim 1, wherein the pixel electrode has a plurality of open regions above the second side electrode.

6. A multi-domain LCD device, comprising;
   first and second substrates;
   a first side electrode formed on the second substrate in a matrix arrangement;
   a second side electrode connected with the first side electrode and formed in a diagonal direction across at least one of a plurality of regions defined in a matrix arrangement by the first side electrode; and
   first and second dielectric frames formed on the first substrate at sides of the second side electrode.

7. The multi-domain LCD device of claim 6, wherein the first side electrode has a quadrangle shape of which first and second sides are formed in a first direction and third and fourth sides are formed in a second direction to be connected with the first and second sides.

8. The multi-domain LCD device of claim 6, wherein at least one of the first side electrode in the first direction and the first side electrode in the second direction, which are adjacent to edges of the second side electrode, is disconnected from the second side electrode.

9. The multi-domain LCD device of claim 6, wherein the second electrode formed across one of the regions and the second side electrode formed across another of the regions adjacent to the one region have a zig-zag pattern.

10. The multi-domain LCD device of claim 6, further comprising an insulating film formed on an entire surface including the first and second side electrodes, a pixel electrode being formed on the insulating film.

11. The multi-domain LCD device of claim 6, wherein the first and second side electrodes are electrically connected with each other.

12. The multi-domain LCD device of claim 6, wherein the first and second dielectric frames cross a central portion of the first side electrode.

13. A multi-domain liquid crystal display device, comprising:
    first and second substrates;
    data lines on the first substrate;
    gate lines on the first substrate and perpendicular to the data lines, the data and gate lines defining a pixel region having at least two liquid crystal domains in the pixel region;
    a first side electrode on the first substrate;
    a second side electrode on the first substrate at a boundary between the two liquid crystal domains;
    a pixel electrode on the first substrate, the second side electrode traversing the pixel electrode; and
    at least one dielectric structure on the second substrate parallel to the second side electrode and correspond to sides of the second side electrode.

14. The multi-domain liquid crystal display device of claim 13, further comprising slits in the pixel electrode in a region corresponding to the second side electrode.

15. The multi-domain liquid crystal display device of claim 13, wherein the first side electrode includes parallel first side electrodes that are parallel to the data lines and transverse first side electrodes that cross the pixel region and are perpendicular to the data lines.

16. The multi-domain liquid crystal display device of claim 15, wherein the parallel first side electrodes extend from respective ones of the transverse first side electrodes to respective ones of the at least one dielectric structure.

17. The multi-domain liquid crystal display device of claim 13, wherein the second side electrode traverses the pixel electrode diagonally.

18. The multi-domain liquid crystal display device of claim 13, wherein the first side electrode is partially opened.

19. The multi-domain liquid crystal display device of claim 13, wherein the at least one dielectric structure has bent portions; and
   wherein the second side electrode is electrically connected to the first side electrode in a region corresponding to the bent portions.

20. The multi-domain liquid crystal display device of claim 13, wherein first side electrode partially surrounds the pixel electrode.

21. A method for fabricating a multi-domain LCD device comprising the steps of:
   forming a first side electrode on a substrate in a matrix arrangement;
   forming a second side electrode to connect both ends with a corner portion of the first side electrode;
   forming a pixel electrode having a plurality of open regions above the second side electrode;
   forming a first dielectric frame and a second dielectric frame on an opposing substrate; and
   forming a liquid crystal layer between the substrates.

22. The method of claim 21, further comprising the step of forming a color filter layer and a common electrode on the opposing substrate.

23. The method of claim 21, wherein the first and second dielectric frames are formed on the common electrode.

24. The method of claim 21, wherein the first and second dielectric frames are formed on the opposing substrate corresponding to both sides of the second side electrode.

25. The method of claim 21, wherein the first and second dielectric frames are formed of any one of photoacrylic, BCB, and black resin.

* * * * *